United States Patent
Ramachandra et al.

(10) Patent No.: US 11,328,610 B2
(45) Date of Patent: May 10, 2022

(54) CUSTOM SEARCH QUERIES FOR FLIGHT DATA

(71) Applicant: HONEYWELL INTERNATIONAL INC., Morris Plains, NJ (US)

(72) Inventors: Sripathi Ramachandra, Karnataka (IN); Mark Pearson, Peoria, AZ (US); Greg Carlucci, Phoenix, AZ (US); Richard Snyder, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 452 days.

(21) Appl. No.: 16/043,854

(22) Filed: Jul. 24, 2018

(65) Prior Publication Data
US 2020/0035109 A1    Jan. 30, 2020

(51) Int. Cl.
*G08G 5/00*    (2006.01)
*G06F 16/9537*    (2019.01)
*B64D 43/00*    (2006.01)

(52) U.S. Cl.
CPC ........... *G08G 5/0039* (2013.01); *B64D 43/00* (2013.01); *G06F 16/9537* (2019.01); *G08G 5/0047* (2013.01)

(58) Field of Classification Search
CPC ............... G08G 5/0039; G08G 5/0047; G06F 16/9537; G06F 16/909; B64D 43/00
See application file for complete search history.

(56) References Cited

U.S. PATENT DOCUMENTS

| | | | | |
|---|---|---|---|---|
| 3,400,471 A | * | 9/1968 | Papin | G09B 9/46 434/33 |
| 4,583,169 A | * | 4/1986 | Cooledge | G06F 30/33 700/86 |
| 5,374,932 A | * | 12/1994 | Wyschogrod | G08G 5/065 342/36 |
| 5,519,618 A | * | 5/1996 | Kastner | G08G 5/0026 701/120 |

(Continued)

FOREIGN PATENT DOCUMENTS

EP    2192504 A1    6/2010

OTHER PUBLICATIONS

Dondenaz et al., Simet, A Solution for Optimal Trajectory Management Under Weather and Environmental Constraints, IEEE Aerospace And Electronic Systems Magazine, Mar. 2014, pp. 26-31, vol. 29, No. 3, IEEE Service Center, Piscataway, New Jersey.

*Primary Examiner* — Behrang Badii
*Assistant Examiner* — Jalal C Coduroglu
(74) *Attorney, Agent, or Firm* — Bookoff McAndrews, PLLC

(57) ABSTRACT

Systems and methods of searching stored flight plan information using a custom search query including at least one aircraft parameter condition or environmental parameter condition. The systems and method include receiving, using a user interface module, a custom search query comprising an aircraft parameter condition or an environmental condition; searching, using a processor module, stored flight plan information for instances in the stored flight plan information that satisfy the aircraft parameter condition or environmental condition; and displaying, using a display module, the instances in the stored flight plan information that satisfy the aircraft parameter condition or environmental condition.

18 Claims, 7 Drawing Sheets

VERTICAL SITUATION DISPLAY INDICATING
TAIL WIND > 30 MINS

(56) References Cited

U.S. PATENT DOCUMENTS

| | | | | |
|---|---|---|---|---|
| 5,547,149 | A * | 8/1996 | Kalberer | B64D 25/00 244/121 |
| 6,578,068 | B1 * | 6/2003 | Bowman-Amuah | G06F 9/465 709/203 |
| 6,892,196 | B1 * | 5/2005 | Hughes | G06F 16/9535 707/754 |
| 7,130,779 | B2 * | 10/2006 | Beverina | G06Q 20/203 703/6 |
| 7,131,136 | B2 * | 10/2006 | Monroe | G08B 13/1966 725/105 |
| 7,423,582 | B2 * | 9/2008 | Holderle | G01S 19/08 342/357.29 |
| 8,468,244 | B2 * | 6/2013 | Redlich | G06Q 10/107 709/225 |
| 8,554,458 | B2 * | 10/2013 | Sawhill | G08G 5/045 701/120 |
| 8,589,994 | B2 * | 11/2013 | Monroe | G08B 13/19673 725/105 |
| 8,849,846 | B1 * | 9/2014 | Wang | G06F 16/23 707/766 |
| 9,008,865 | B2 * | 4/2015 | Joseph | G05B 15/02 701/3 |
| 9,168,859 | B2 * | 10/2015 | Krishnamurthy | G01C 21/32 |
| 9,183,560 | B2 * | 11/2015 | Abelow | G06Q 10/10 |
| 9,262,931 | B2 * | 2/2016 | Parthasarathy | G08G 5/0034 |
| 9,273,969 | B2 * | 3/2016 | Parthasarathy | G06F 3/0488 |
| 9,335,917 | B2 * | 5/2016 | Dostal | G06F 3/04847 |
| 9,377,325 | B2 * | 6/2016 | Behara | G01C 23/00 |
| 9,404,752 | B2 | 8/2016 | Courteville et al. | |
| 9,461,876 | B2 * | 10/2016 | Van Dusen | G06N 5/04 |
| 9,527,601 | B2 * | 12/2016 | Wyatt | G08G 5/0021 |
| 9,561,860 | B2 * | 2/2017 | Knapp | G08G 5/0021 |
| 9,593,961 | B2 * | 3/2017 | Ramaiah | G08G 5/0052 |
| 9,669,904 | B2 * | 6/2017 | Hanson | B64C 39/024 |
| 10,026,322 | B2 * | 7/2018 | Krishna | H04B 7/18506 |
| 10,678,233 | B2 * | 6/2020 | Cella | G05B 19/4183 |
| 2005/0098681 | A1 | 5/2005 | Berson et al. | |
| 2006/0112119 | A1 * | 5/2006 | Vian | G07C 5/085 |
| 2012/0022778 | A1 | 1/2012 | Mishra | |
| 2013/0274991 | A1 * | 10/2013 | Cheriere | G06F 11/0739 701/32.9 |
| 2013/0274992 | A1 * | 10/2013 | Cheriere | G06F 11/0739 701/32.9 |
| 2015/0332490 | A1 | 11/2015 | Coulmeau et al. | |
| 2016/0292932 | A1 * | 10/2016 | Gremmert | H04B 7/18506 |
| 2017/0032576 | A1 | 2/2017 | Mazoyer et al. | |
| 2017/0141839 | A1 * | 5/2017 | Chiodini | H04B 7/18506 |
| 2017/0183105 | A1 | 6/2017 | Fourner et al. | |
| 2017/0337754 | A1 * | 11/2017 | Wang | G07C 5/0841 |
| 2020/0035109 | A1 * | 1/2020 | Ramachandra | G06F 16/9537 |

* cited by examiner

US 11,328,610 B2

CUSTOM SEARCH QUERIES FOR FLIGHT DATA

TECHNICAL FIELD

The present disclosure generally relates to the field of aircraft display systems. More particularly, the present disclosure relates to an aircraft display system via which stored flight data may be searched with a custom search query.

BACKGROUND

Navigating an aircraft is a complex task, which requires decision-making on the basis of navigation information. For example, pilots may use information related to the locations of waypoints along a planned flight route for the aircraft or predicted weather conditions at certain points along the planned flight route, or other such navigation information in order to make navigation decisions during the course of a flight.

Typically, a flight management system (FMS) is used to assist the pilot in accessing the relevant information needed to make a navigation decision. However, conventional FMS systems must normally be manually searched by the pilot in order to find the desired information needed for a decision. This manual searching may require the pilot to sort through a large amount of information presented in different formats, such as text documents, tables and maps, in order to find the desired information. Such "heads down" pilot searching reduces the situational awareness of the pilot and may take an undesirably long time, especially if the pilot does not search for the desired information on the FMS in an efficient manner.

During certain flight scenarios such as take-off or landing maneuvers, the workload of the pilot increases and the time window for making a navigation decision is reduced. As such, it is desirable for the pilot to access the desired information needed to make a navigation decision as quickly and as efficiently as possible. Furthermore, it is desirable for the information to be presented to the pilot in a consistent manner, so as to reduce the likelihood of interpretation errors. Further advantages of exemplary embodiments will be made apparent from the following description.

BRIEF SUMMARY

This summary is provided to introduce a selection of concepts in a simplified form that are further described below in the detailed description section.

In an exemplary embodiment, there is provided an aircraft display system. The aircraft display system includes a memory module configured to store flight plan information; a receiver module configured to receive updated flight plan information and a display module. The aircraft display system also includes a user interface module configured to receive a custom search query, the custom search query comprising an aircraft parameter condition or an environmental parameter condition. The aircraft display system also includes a processor module operably connected to the memory module, the receiver module, the display module, and the user interface module. The processor module is configured to update flight plan information stored in the memory module with updated flight plan information received by the receiver and, when a custom search query is received at the user interface module, the processor module is further configured to search the stored flight plan information for flight plan information comprising aircraft parameters or environmental parameters that satisfy the aircraft parameter condition or environmental parameter condition of the custom search query and to cause the display module to display instances of the flight plan information containing the aircraft parameters or environmental parameters that satisfy the aircraft parameter condition or the environmental parameter condition of the custom search query.

In another exemplary embodiment, there is provided a method of displaying custom search query results to a pilot. The method includes the steps of receiving, using a user interface module, a custom search query comprising an aircraft parameter condition or an environmental condition and searching, using a processor module, stored flight plan information for instances in the stored flight plan information that satisfy the aircraft parameter condition or environmental condition. The method also includes the step of displaying, using a display module, the instances in the stored flight plan information that satisfy the aircraft parameter condition or environmental condition.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
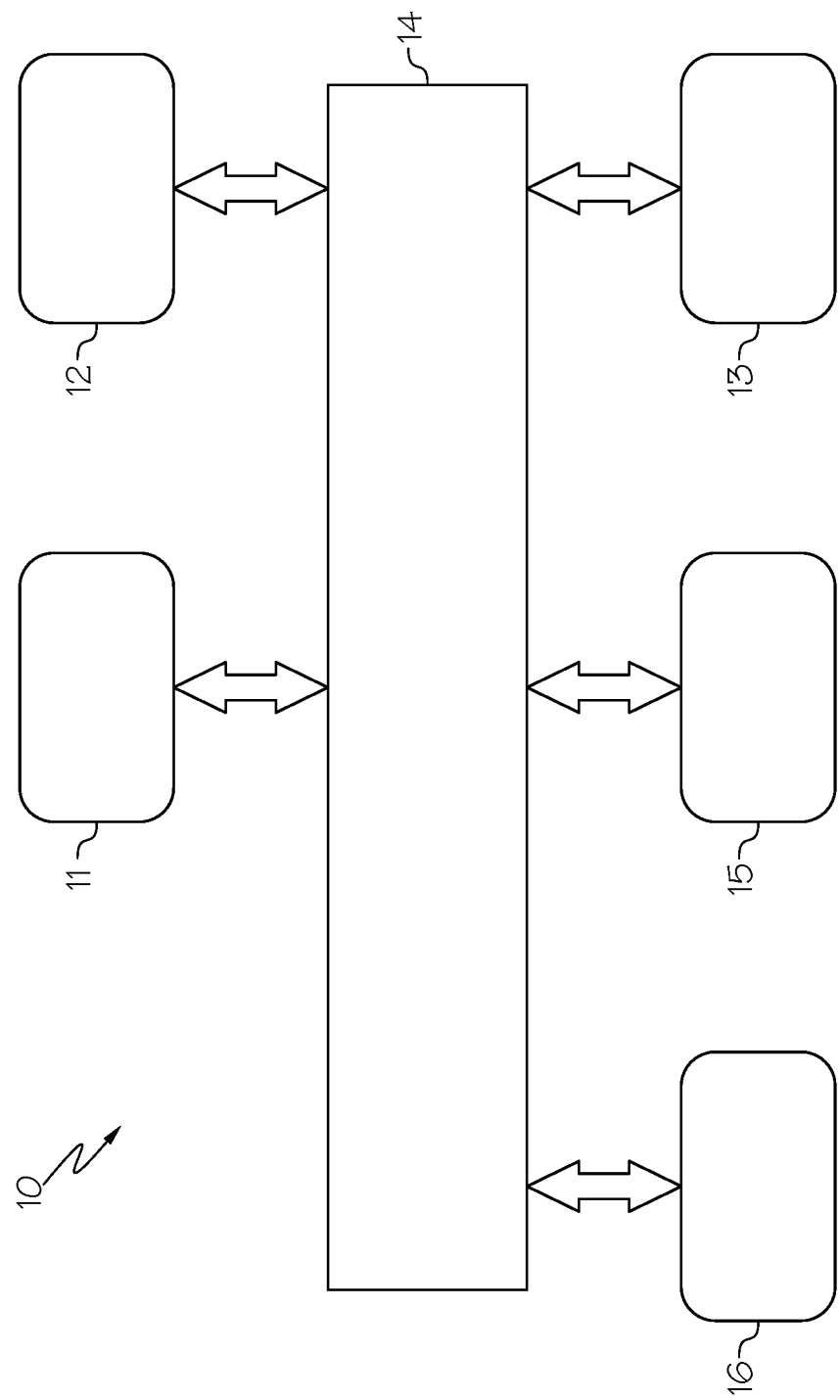
FIG. 1 shows a functional block diagram of an aircraft display system in accordance with various embodiments.

FIG. 1 shows a schematic of an aircraft display system 10 in accordance with various embodiments. Outlined arrows in this figure are used to show operable connections between the various elements in this figure. The aircraft display system 10 includes a memory module 11. The memory module 11 is configured to store flight plan information associated with the planned flight route of the aircraft. In an exemplary embodiment, the stored flight plan information includes predicted flight plan information, which predictions are based on extrapolations from current environmental and aircraft parameters.

The predicted flight parameters include predicted aircraft parameters and predicted environmental parameters. In an exemplary embodiment, the flight plan information stored by the memory module 11 includes one or more of: the predicted flight path angle of the aircraft at each location along the predicted flight path; the predicted banking angle of the aircraft at each location along the predicted flight path; the predicted airspeed of the aircraft at each location along the predicted flight path; the minimum and maximum calibrated airspeed at each location along the predicted flight path; the predicted fuel flow at each location along the predicted flight path; the total fuel remaining at each location along the predicted flight path; the predicted time elapsed from origin at each location along the predicted flight path; the predicted gross weight of the aircraft at each location along the predicted flight path; the predicted remaining fuel weight of the aircraft at each location along the predicted flight path; the predicted remaining flight time of the aircraft at each location along the predicted flight path; the predicted drag force on the aircraft at each location along the predicted flight path; the predicted lift force on the aircraft at each location along the predicted flight path; the predicted speed brake position at each location along the predicted flight path; the ISA deviation of the aircraft at each location along the predicted flight path; the minimum and maximum envelope of altitude of the aircraft at each location along the predicted flight path; the predicted wind speed and direction at each location along the predicted flight path; the ferry fuel tank fuel quantity at each location along the predicted flight path; and the predicted temperature at each location along the predicted flight path. The stored flight plan information typically relates to either an aircraft parameter (such as aircraft airspeed, flight path angle) or an environmental parameter (such as air temperature or wind speed).

The aircraft display system 10 further includes a receiver module 12. The receiver module 12 is configured to receive updated flight plan information from on-board and off-board locations. In an exemplary embodiment, the receiver module 12 is configured to receive updated flight plan information from another aircraft, such as a pilot report (PIREP) from another aircraft, for example via an Automatic Dependent Surveillance Broadcast (ADS-B) containing information about an unexpected weather event (such as a high wind-speed event or a turbulence event) or other such environmental parameter change along the predicted flight route. In an additional or alternative exemplary embodiment, the receiver module 12 is configured to receive updated flight plan information from a ground station, for example a closure of airspace along the predicted flight route. In an additional or alternative exemplary embodiment, the receiver module 12 is configured to receive updated flight plan information directly or indirectly from one or more sensor modules 13 onboard the aircraft, for example a measured wind speed magnitude that is different to the predicted wind speed magnitude at the aircraft's present location. In exemplary embodiments, the receiver module 12 is configured to receive updated flight plan information from external sources, for example a ground station.

The receiver module 12, the memory module 11 and the one or more sensor modules 13 are each operably connected to a processor module 14. The processor module 14 is configured to receive updated flight plan information from the receiver module 12. After receiving the updated flight plan information, the processor module 14 is configured to update the stored flight plan information in the memory module 11 with the received updated flight plan information. For example, if the original stored flight plan information included a predicted flight time of 3 hours when the aircraft is located at a particular location, but if an airspace closure received at the receiver module 12 from a ground station means that the aircraft must be re-routed via a different waypoint, which re-routing will increase the flight time by 20 minutes, the processor module 14 is configured to update the flight plan information stored in the memory module 11 to instead store a predicted flight time of 3 hours and 20 minutes when the aircraft is located at the same particular location.

The aircraft display system 10 further includes a user interface module 15, which in an exemplary embodiment includes an input/output (I/O) module. The user interface module 15 is operably connected to the processor module 14. The user interface module 15 is configured to allow for the input and output of data to other devices that are operably coupled to the processing module 14. In an exemplary embodiment, the user interface module 15 allows for the connection for pilot input through an input module (not shown), for example a keyboard. In an exemplary embodiment, the user interface module 15 allows for an output to be provided to an output module (not shown), for example a printer.

The aircraft display system 10 further includes a display module 16 operably connected to the processor module 14. The display module 16 is configured to display information to the pilot, as will be explained in more detail below. In an exemplary embodiment, the display module 16 includes a VSD (vertical situation display). In an exemplary embodiment, the display module 16 includes a ND (navigation display). In an exemplary embodiment, the display module 16 is a PFD (primary flight display). In an exemplary embodiment, the display module includes a lateral path display, or a combination of one or more of the above types of display.

In use, a pilot uses the user interface module 15 to input a custom search query into the aircraft display system, the custom search query including at least one of an aircraft parameter condition or an environmental parameter condition, as will explained in more detail below. In an exemplary embodiment, the custom search query is a database search query for specific instances in the stored flight plan information of the queried aircraft or environmental parameter conditions being met. In an exemplary embodiment, Boolean logic may be used in the custom search query.

Figure 2:
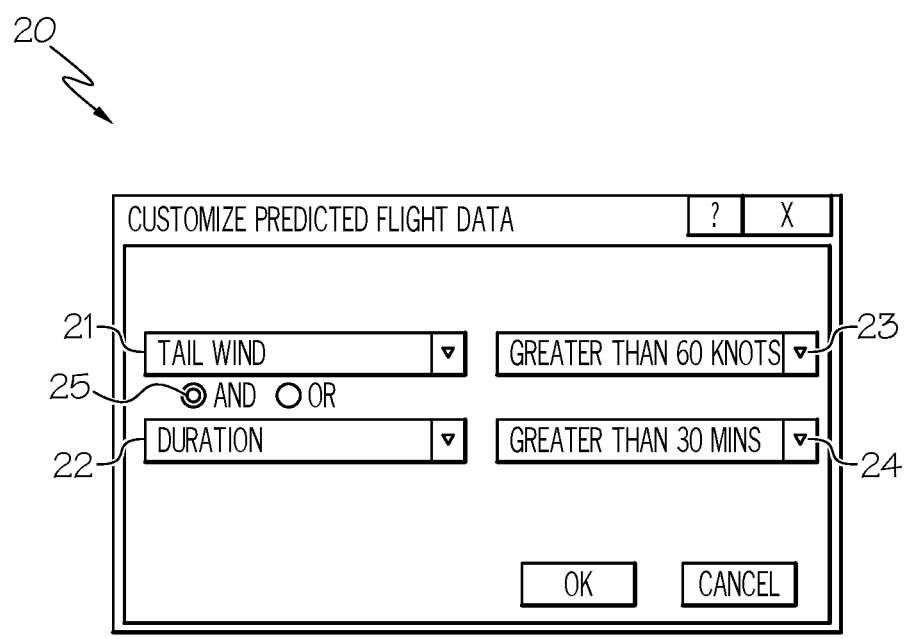
FIG. 2 shows a custom search query in accordance with various embodiments.

For example, as shown in FIG. 2, the custom search query may be a custom search query entered into a dedicated custom search query window 20 for all instances in the stored flight plan information where a tail wind of greater than 60 knots is predicted to exist for a duration greater than 30 minutes. As such, the custom search query may be input into the user interface module 15 in the form shown in FIG. 2, with the environmental parameter "Tail wind" and the associated environmental parameter conditions "greater than 60 knots and for a duration of greater than 30 minutes" being selected in parameter input boxes 21, 22, 23 and 24 from a list of pre-determined searchable parameters, with the Boolean operator "AND" selected from a Boolean operator list 25 to define this custom search query.

In an exemplary embodiment, the environmental or aircraft parameter "condition" input boxes 23, 24 related to the corresponding aircraft or environmental parameter input boxes 21, 22 include conditions which are dynamically updated based on the parameter selected in the corresponding input box. For example, if the parameter "Tail-wind" is chosen from the pre-determined list of parameters in parameter input box 21, the selectable list of "conditions" presented to the pilot in the corresponding "condition" box 23 is dynamically updated with a pre-determined list of conditions corresponding to the selected parameter, for example a list of options including: "greater than 20 knots"; "greater than 40 knots"; greater than "60 knots" and so on. In an alternative embodiment, a "condition" list is not presented to the pilot in condition box 23, and the pilot may instead enter a custom condition using an input device such as a keyboard operably connected to the user interface module, for example specifying "greater than 21 knots" as an environmental parameter condition using a keyboard. In an alternative embodiment, both of the options of selecting a condition from a list of pre-determined conditions and of freely specifying a custom condition with an input device are available to the pilot.

As can be seen in FIG. 2, Boolean operators, for example "AND" and/or "OR" may be selected by the pilot from a Boolean operator list 25 when entering a custom search query. Although not shown in this figure, further Boolean operators may also be selected from the Boolean operator list 25 whilst entering the custom search query, for example the Boolean operators "NOT"; "AND NOT"; "EQUALS"; "NOT EQUAL"; "LESS THAN"; "MORE THAN"; and so on, may be selected by the pilot. Boolean operators may be selected from a pre-determined list of operators, or may be input by a pilot, for example via a keyboard operably connected to the user interface module 15.

In an exemplary embodiment, the custom search query condition defined using the condition input boxes 23, 24 is in the form of a numerical range, for example "greater than 60"; "less than 60" or "between 50 and 60". By specifying a numerical range for the search query condition, a more efficient searching algorithm may be used to search the flight plan information for instances where the flight plan information satisfies the search query condition can be used as compared to search queries not containing a numerical range.

After the custom search query is entered by the pilot, the processor module 14 is configured to search, using a searching algorithm, the flight plan information stored in the memory module 11 for instances where the custom search query condition criteria are satisfied. After identifying instances in the stored flight plan information where the custom search query criteria are satisfied, the processor module 14 causes the display module 16 to display those instances in the stored flight plan information to the pilot.

Figure 3:
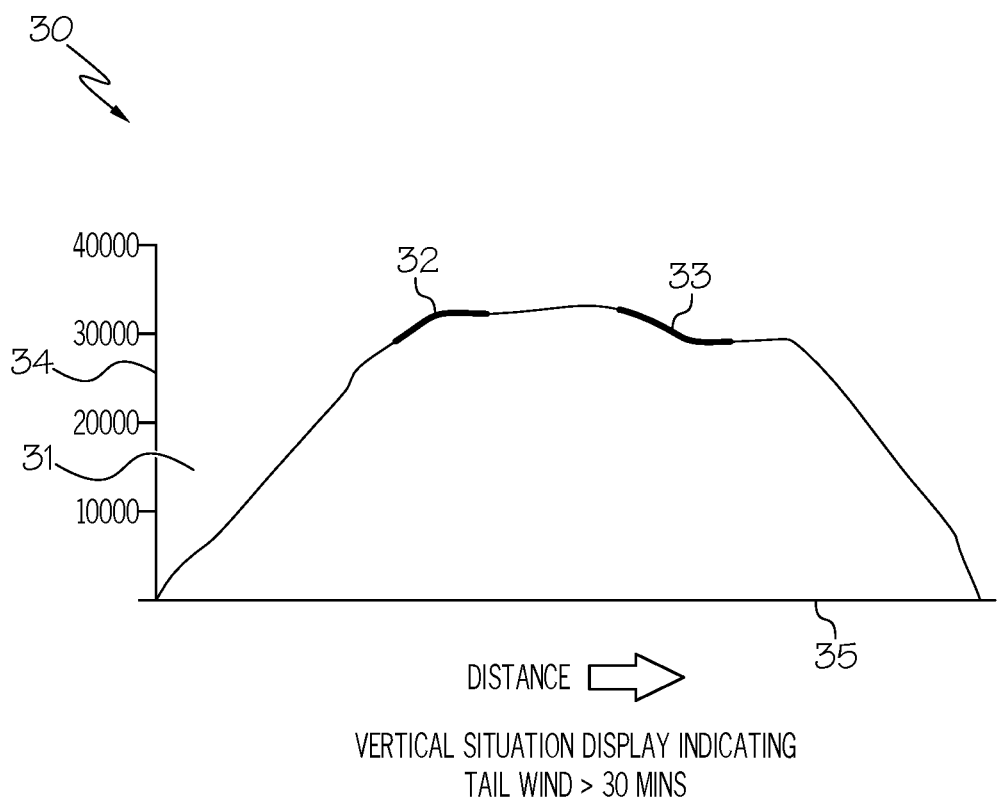
FIG. 3 shows a returned results graph in accordance with various embodiments.

An exemplary returned results display 30 is shown in FIG. 3, which corresponds to the returned results from the specific query shown in FIG. 2. As can be seen in FIG. 3, the predicted tail wind speeds for the entire predicted flight are presented to the pilot on a vertical situation display (VSD) in the form of a graph 31 of altitude of the aircraft vs. distance of the aircraft into the predicted flight route. The instances 32, 33 of the flight plan information which satisfy the search query criteria of a tail wind being greater than 60 knots for a duration of greater than 30 minutes are highlighted or otherwise visually distinguished from the remainder of the predicted tail wind speeds shown on the graph 31.

In an exemplary embodiment, the pilot is able to customize the axes 34, 35 of the presented graph via inputs at the user interface module 15. In particular, in an exemplary embodiment the pilot is able to select the resolution of the axes on the graph 31 using the user interface module 16.

By highlighting the instances 32, 33 of the flight plan information that satisfy the search query criteria on the returned results display 30, the man-machine interface between the pilot and the aircraft display system 10 is improved such that the pilot can more quickly and more easily visually interpret the returned results, thereby allowing for faster and more effective navigational decision making with a correspondingly reduced "heads-down" time for the pilot.

Furthermore, since the predicted flight route and flight parameters stored in the memory module 11 are updated via information received at the receiver module 12 or via information sensed at the one or more sensor modules 13, the returned results display 30 might change between two subsequent custom search queries. By repeatedly requesting and re-requesting custom search queries, the pilot is able to obtain information which can be used to improve the aircraft's performance. For example, by repeatedly requesting and re-requesting information associated with tail wind speeds to determine predicted tail wind speed changes, the pilot may be able to make navigation decisions on the basis of this information to better conserve aircraft fuel. As another example, by requesting and re-requesting results to a search query based on aircraft velocity, the pilot may be able to repeatedly determine whether the aircraft is in an energy state overload, such that the aircraft's kinetic energy is too high to attempt a landing. Using the returned results, the pilot may then take pre-emptive action to, for example, decrease the energy state of the aircraft prior to landing.

Figure 4:
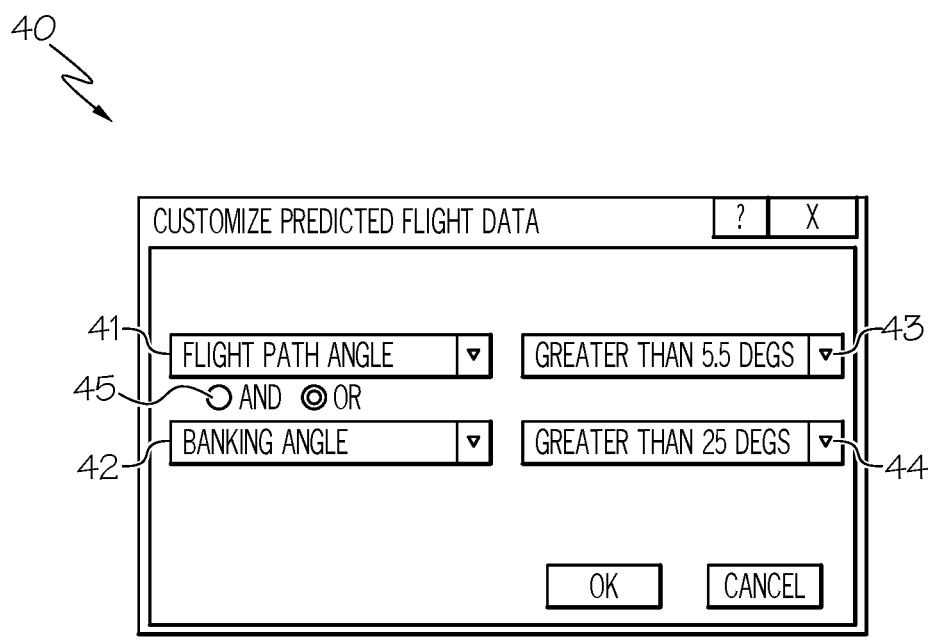
FIG. 4 shows another custom search query in accordance with various embodiments.

Another exemplary custom search query window 40 is shown in FIG. 4. In FIG. 4, the search query condition entered via the parameter input boxes 41, 42 and the condition input boxes 43, 44 and the Boolean operator list 45 is either that the predicted flight path angle of the aircraft is greater than 5.5 degrees or that the predicted banking angle of the aircraft is greater than 25 degrees. In response to the custom search query being entered, the processor module 13 is configured to search the flight plan information stored in the memory module 11 for instances in the stored flight plan information that satisfy either one of these two conditions specified in the search query criteria. After identifying instances in the stored flight plan information where the search criteria is satisfied, the processor module 14 causes the display module 16 to display the results to the pilot.

Figure 5:
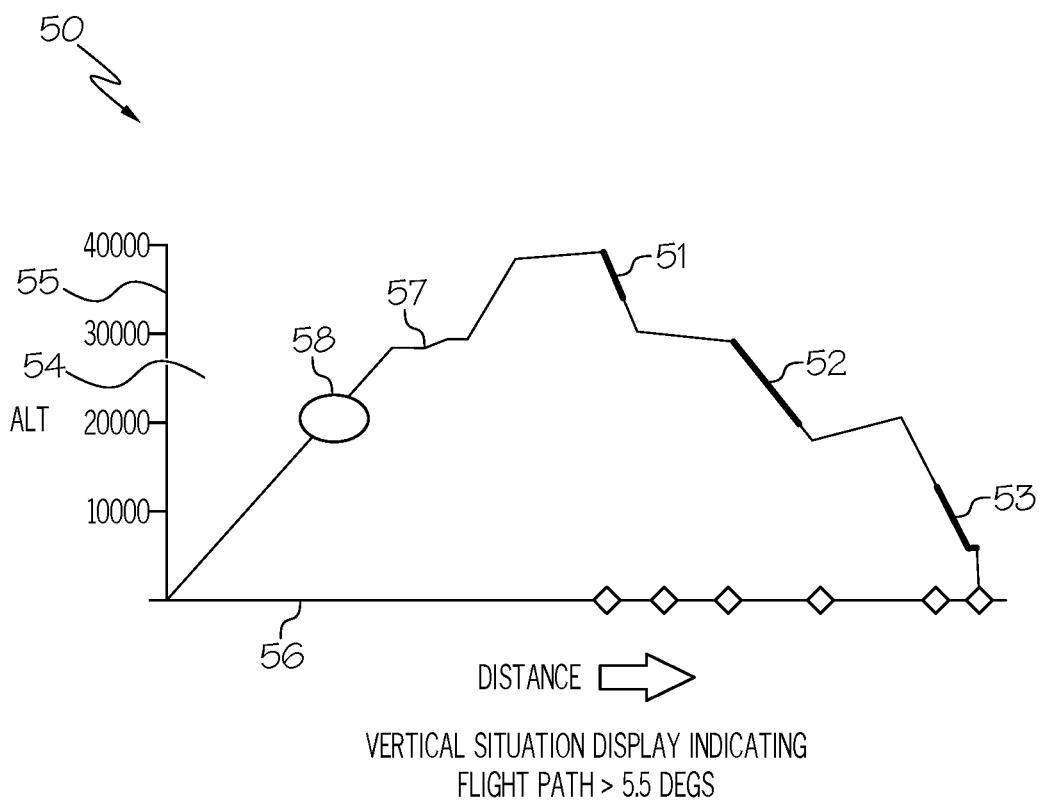
FIG. 5 shows another returned results graph in accordance with various embodiments.

An exemplary returned results display 50 for the specific custom search query shown in FIG. 4 is shown in FIG. 5. As can be seen in FIG. 5, the instances 51, 52, 53 in the predicted flight route where the flight path angle is predicted to be greater than 5.5 degrees or where the banking angle is predicted to be greater than 25 degrees are displayed to the pilot. In the exemplary returned results display 50 shown in FIG. 5, the returned results are displayed in the form of a graph 54. In particular, in the graph 54 of FIG. 5, the axes 55, 56 correspond to the altitude of the aircraft throughout the predicted flight route and the distance into the predicted flight route. The instances 51, 52, 53 in the predicted flight route where the flight path angle is predicted to be greater than 5.5 degrees or where the banking angle is predicted to be greater than 25 degrees are highlighted on a line 57 corresponding to the predicted altitude of the aircraft along the predicted flight route.

By highlighting the instances 51, 52, 53 of the graph 54 showing the aircraft's predicted altitude along the predicted flight route which satisfy the search criteria of the custom search query, it is possible for the pilot to visualize potentially "difficult" portions of the predicted flight well before these portions of the flight are encountered, thereby improving the situational awareness of the pilot.

In exemplary embodiments, a dynamic aircraft marker 58 may also be included on the line 57, the dynamic marker 58 indicating to the pilot the current location of the aircraft. In this manner, the pilot may have improved situational awareness as to when potentially difficult portions of the predicted flight may be encountered.

In exemplary embodiments, each custom search query is then stored in the memory module 11 after the query is made. The pilot is then able to select previously-made custom search queries to allow for a faster repeat custom search. In exemplary embodiments, the pilot is able to designate particular search queries as preferred custom search queries with a custom identifier such as a unique name or number, thereby allowing for preferred custom search queries to be identified quickly by the pilot for repeat searching.

In exemplary embodiments, three or more parameter input boxes are available for custom searching of the stored flight plan information. In exemplary embodiments, the number of parameter input boxes may be specified by the pilot prior to a custom search query being formulated by the pilot. In such exemplary situations, the pilot may select a large number (for example ten or more) input boxes or Boolean logic operator inputs to define the custom search query criteria.

In exemplary embodiments, "free-text" Boolean operator strings may be used to define the custom search query. The free-text Boolean operator strings include, for example, bracketed terms and wildcard operators, to allow for advanced searching of the stored flight plan information by the pilot.

Figure 6:
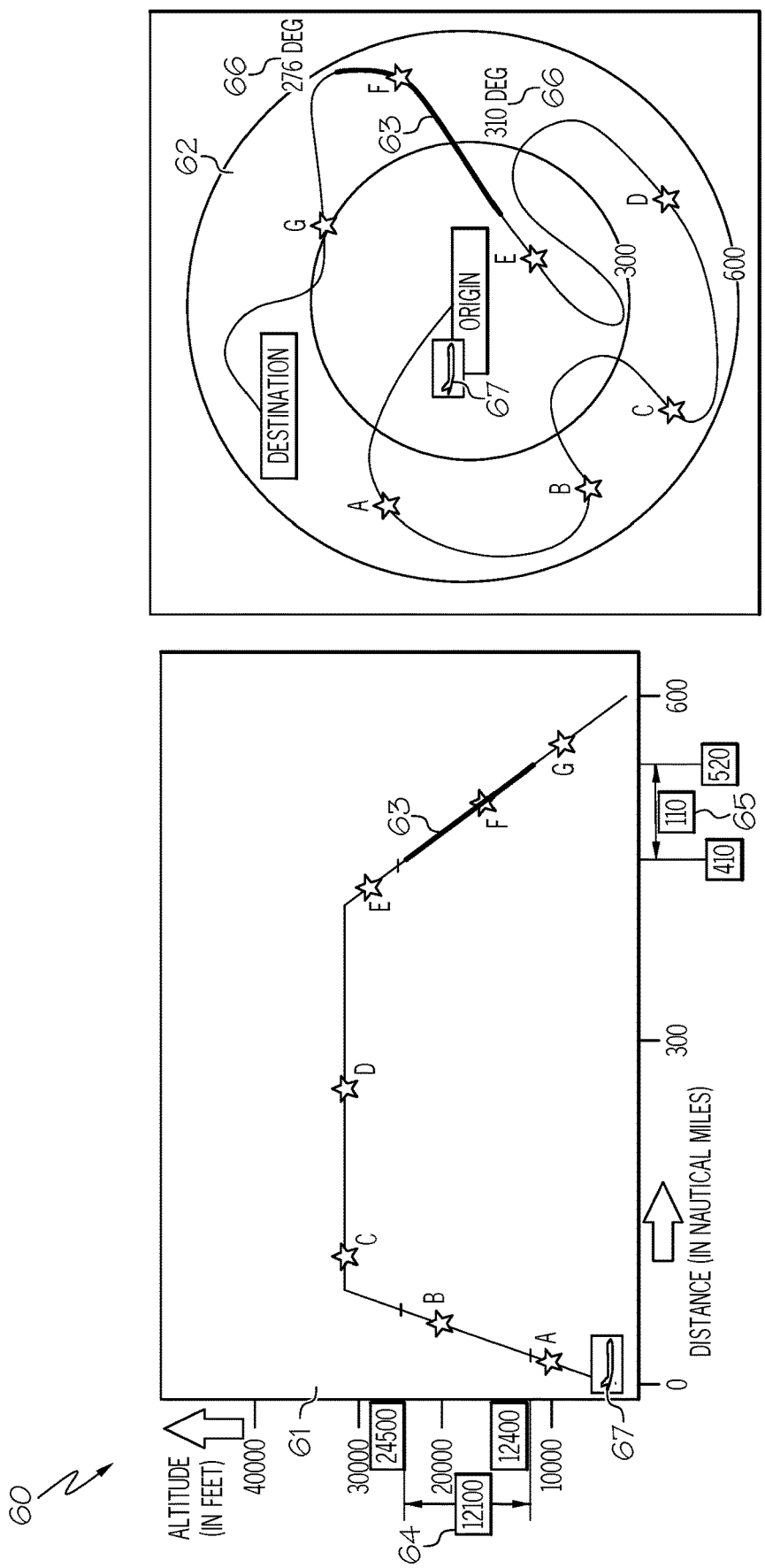
FIG. 6 shows another results graph in accordance with various embodiments.

FIG. 6 shows another exemplary returned results graph 60. The returned results graph 60 includes two views; a vertical situation display 61 and a lateral path display 62. As can be seen in FIG. 6, the returned results graph highlights the instance 63 where the stored flight plan information satisfies the search criteria on both of the vertical situation display 61 and also the lateral path display 62, in order to provide further information to the pilot and further increase the situational awareness of the pilot. As can also be seen in the exemplary embodiment of FIG. 6, the change in altitude 64 and change in distance 65 over which the instance 63 occurs is highlighted to the pilot on the vertical situation display 61 and the change in angle 66 over which the instance occurs is highlighted to the pilot on the lateral path display 62, to further increase the ease of visualization of the returned results graph 60 by the pilot. Still further, waypoints A-G are also shown on each display of the returned results graph 60.

As can also be seen in the exemplary embodiment of FIG. 6, an aircraft marker 67 is shown on each of the vertical situation display 61 and the lateral path display 62 to indicate the present location of the aircraft to the pilot.

Figure 7:
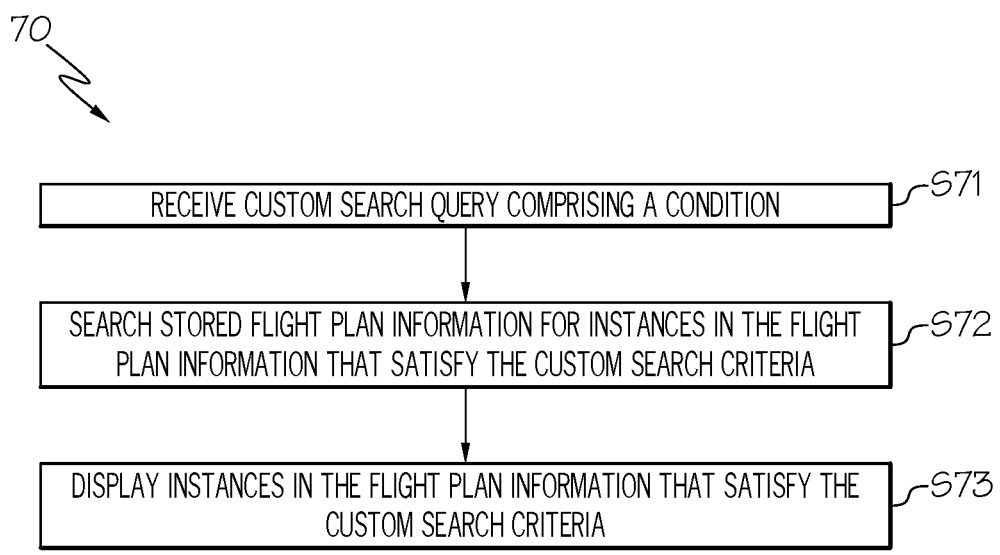
FIG. 7 shows a flowchart outlining a method in accordance with various embodiments.

FIG. 7 shows a flowchart detailing method 70 of display the results of a custom search query to At step S71, a custom search query is received at a processor module. The custom search query is formulated using a user interface module, and comprises at least one of an environmental parameter condition and an aircraft parameter condition.

At step S72, a search is performed by the processor module, using the custom search query, for flight plan information stored in a memory module that satisfy the custom search criteria. After identifying instances in the stored flight plan information that satisfy the custom search criteria, the method progresses to step S73.

At Step S73, the identified instances in the flight plan information which satisfy the custom search criteria are displayed to the pilot using a display module.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:
1. An aircraft display system, comprising:
a memory module configured to store flight plan information;
a receiver module configured to receive updated flight plan information;
a display module;
a user interface module configured to receive a custom search query, the custom search query comprising at least one of an aircraft parameter condition and an environmental parameter condition, wherein the custom search query includes a Boolean operator; and
a processor module operably connected to the memory module, the receiver module, the display module, and the user interface module, the processor module configured to update flight plan information stored in the memory module with updated flight plan information received by the receiver and, when a custom search query is received at the user interface module, the processor module is further configured to search the stored flight plan information for flight plan information comprising aircraft parameters or environmental parameters that satisfy the aircraft parameter condition or environmental parameter condition of the custom search query and to cause the display module to display instances of the flight plan information containing the aircraft parameters or environmental parameters that satisfy the aircraft parameter condition or the environmental parameter condition of the custom search query.

2. The aircraft display system of claim 1, wherein the at least one of the aircraft parameter condition and the environmental parameter condition comprises a numerical range.

3. The aircraft display system of claim 1, wherein the display module comprises a vertical situation display.

4. The aircraft display system of claim 1, wherein the display module comprises a lateral path display.

5. The aircraft display system of claim 1, further comprising a sensor module configured to sense environmental conditions of an environment surrounding the aircraft and to transmit the sensed environmental conditions to the receiver module.

6. The aircraft display system of claim 1, wherein the stored flight plan information includes predicted flight plan information.

7. The aircraft display system of claim 1, wherein the instances of the flight plan information containing the aircraft parameters or environmental parameters that satisfy the aircraft parameter condition or the environmental parameter condition of the custom search query are displayed on a graph of the display module.

8. The aircraft display system of claim 7, wherein the graph further comprises a dynamic aircraft marker indicating a present location of the aircraft.

9. The aircraft system of claim 1, wherein the memory module is configured to store custom search queries for repeat use.

10. The aircraft system of claim 9, wherein the user interface module is configured to display the stored previous custom search queries.

11. A method of displaying custom search query results to a pilot, comprising:
    receiving, using a user interface module, a custom search query comprising an aircraft parameter condition or an environmental condition, wherein the custom search query includes a Boolean operator;
    searching, using a processor module, stored flight plan information for instances in the stored flight plan information that satisfy the aircraft parameter condition or environmental condition; and
    displaying, using a display module, the instances in the stored flight plan information that satisfy the aircraft parameter condition or environmental condition.

12. The method of claim 11, further comprising updating, using the processor module, the stored flight plan information on the basis of updated flight plan information.

13. The method of claim 12, wherein the updated flight plan information is received from sensed environmental conditions.

14. The method of claim 11, further comprising storing, using a memory module, the custom search query.

15. The method of claim 14, further comprising displaying, using the display module, the stored custom search query.

16. The method of claim 11, wherein the aircraft parameter condition or environmental condition comprises a numerical range.

17. The method of claim 11, wherein the step of displaying the instances in the stored flight plan information that satisfy the aircraft parameter condition or environmental condition comprises displaying the instances on a vertical situation display.

18. The method of claim 11, wherein the stored flight plan information comprises predicted flight plan information.

* * * * *